(12) United States Patent
Kim

(10) Patent No.: US 7,269,114 B2
(45) Date of Patent: Sep. 11, 2007

(54) METHOD AND APPARATUS FOR CONTROLLING RECORDING TO OPTICAL DISC TO COPE WITH SHOCK ERRORS

(75) Inventor: Tae-jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 10/781,846

(22) Filed: Feb. 20, 2004

(65) Prior Publication Data

US 2004/0257948 A1    Dec. 23, 2004

(30) Foreign Application Priority Data

Feb. 20, 2003   (KR)   .................. 10-2003-0010726

(51) Int. Cl.
*G11B 5/09*   (2006.01)
(52) U.S. Cl. .................. 369/53.35; 369/53.18; 369/47.22
(58) Field of Classification Search ............. 369/53.35, 369/53.18, 47.22; *G11B 5/09*
See application file for complete search history.

(56) References Cited

U.S. PATENT DOCUMENTS

| | | | | |
|---|---|---|---|---|
| 5,978,812 A | * | 11/1999 | Inokuchi et al. ............ | 707/200 |
| 6,163,515 A | * | 12/2000 | Yamamoto ................. | 369/53.2 |
| 6,584,053 B1 | | 6/2003 | Tsukihashi ............... | 369/53.34 |
| 6,628,602 B2 | * | 9/2003 | Ohno et al. .............. | 369/275.3 |
| 6,671,249 B2 | * | 12/2003 | Horie ...................... | 369/275.3 |
| 6,697,309 B2 | * | 2/2004 | De Kimpe et al. ........ | 369/47.3 |
| 6,762,980 B2 | * | 7/2004 | Kadlec et al. ........... | 369/44.28 |
| 6,993,250 B2 | * | 1/2006 | Ono et al. ................ | 386/112 |
| 7,023,780 B2 | * | 4/2006 | Pan et al. ................ | 369/53.24 |
| 7,099,246 B2 | * | 8/2006 | Hayashi et al. .......... | 369/47.33 |

FOREIGN PATENT DOCUMENTS

| | | |
|---|---|---|
| EP | 0 974 966 A1 | 1/2000 |
| JP | 09-063203 | 3/1997 |
| JP | 10143980 | 5/1998 |
| JP | 2001-357637 | 12/2001 |
| JP | 2001357637 | 12/2001 |
| KR | 1020000066892 | 11/2000 |
| KR | P2002-0059695 | 7/2002 |
| KR | P2002-0096989 | 12/2002 |

* cited by examiner

*Primary Examiner*—Aristotelis M. Psitos
(74) *Attorney, Agent, or Firm*—Staas & Halsey, LLP

(57) ABSTRACT

A method of controlling recording of data with respect to each track of a once-writable optical disc, includes: detecting whether a shock error occurs during recording of track information; if the shock error is detected, stopping the recording of the track information and estimating a position where the recording of the track information has stopped; recording dummy data from a backward position behind the estimated position as much as a predetermined period of time, for a predetermined period of time; and defining an error track from a start position of a track to a position where the recording of the dummy data has ended.

32 Claims, 4 Drawing Sheets

FIG. 3

| FRAME NUMBER | CONTROL & ADR | TNO | POINT | MIN | SEC | FRM | ZERO | PMIN | PSEC | PFRM |
|---|---|---|---|---|---|---|---|---|---|---|
| 1 | 02 | 00 | 00 | 20 | 15 | 14 | 00 | 00 | 00 | 00 |
| 2 | 02 | 00 | 00 | 20 | 15 | 14 | 01 | 00 | 00 | 00 |
| 3 | 02 | 00 | 00 | 20 | 15 | 14 | 02 | 00 | 00 | 00 |
| 4 | 02 | 00 | 00 | 20 | 15 | 14 | 03 | 00 | 00 | 00 |
| 5 | 02 | 00 | 00 | 20 | 15 | 14 | 04 | 00 | 00 | 00 |
| 6 | 02 | 00 | 00 | 20 | 15 | 14 | 05 | 00 | 00 | 00 |
| 7 | 02 | 00 | 00 | 20 | 15 | 14 | 06 | 00 | 00 | 00 |
| 8 | 02 | 00 | 00 | 20 | 15 | 14 | 07 | 00 | 00 | 00 |
| 9 | 02 | 00 | 00 | 20 | 15 | 14 | 08 | 00 | 00 | 00 |
| 10 | 02 | 00 | 00 | 20 | 15 | 14 | 09 | 00 | 00 | 00 |
| 11 | 01 | 00 | 01 | 05 | 45 | 67 | 00 | 00 | 02 | 01 |
| 12 | 01 | 00 | 01 | 05 | 45 | 67 | 01 | 00 | 02 | 01 |
| 13 | 01 | 00 | 01 | 05 | 45 | 67 | 02 | 00 | 02 | 01 |
| 14 | 01 | 00 | 01 | 05 | 45 | 67 | 03 | 00 | 02 | 01 |
| 15 | 01 | 00 | 01 | 05 | 45 | 67 | 04 | 00 | 02 | 01 |
| 16 | 01 | 00 | 02 | 12 | 01 | 09 | 05 | 05 | 45 | 67 |
| 17 | 01 | 00 | 02 | 12 | 01 | 09 | 06 | 05 | 45 | 67 |
| 18 | 01 | 00 | 02 | 12 | 01 | 09 | 07 | 05 | 45 | 67 |
| 19 | 01 | 00 | 02 | 12 | 01 | 09 | 08 | 05 | 45 | 67 |
| 20 | 01 | 00 | 02 | 12 | 01 | 09 | 09 | 05 | 45 | 67 |
| 21 | 01 | 00 | 03 | 30 | 17 | 42 | 00 | 12 | 04 | 09 |
| 22 | 01 | 00 | 03 | 30 | 17 | 42 | 01 | 12 | 04 | 09 |
| 23 | 01 | 00 | 03 | 30 | 17 | 42 | 02 | 12 | 04 | 09 |
| 24 | 01 | 00 | 03 | 30 | 17 | 42 | 03 | 12 | 04 | 09 |
| 25 | 01 | 00 | 03 | 30 | 17 | 42 | 04 | 12 | 04 | 09 |
| 26 | 01 | 00 | 04 | 37 | 50 | 18 | 05 | 30 | 19 | 52 |
| 27 | 01 | 00 | 04 | 37 | 50 | 18 | 06 | 30 | 19 | 52 |
| 28 | 01 | 00 | 04 | 37 | 50 | 18 | 07 | 30 | 19 | 52 |
| 29 | 01 | 00 | 04 | 37 | 50 | 18 | 08 | 30 | 19 | 52 |
| 30 | 01 | 00 | 04 | 37 | 50 | 18 | 09 | 30 | 19 | 52 |
| 31 | etc. : unrecorded | | | | | | | | | |

| FRAME NUMBER | CONTROL & ADR | TNO | POINT | MIN | SEC | FRM | ZERO | PMIN | PSEC | PFRM |
|---|---|---|---|---|---|---|---|---|---|---|
| n | 01 | 00 | A0 | absolute | time | | 00 | 01 | 00 | 00 |
| n+1 | 01 | 00 | A0 | absolute | time | | 00 | 01 | 00 | 00 |
| n+2 | 01 | 00 | A0 | absolute | time | | 00 | 01 | 00 | 00 |
| n+3 | 05 | 00 | B1 | 00 | 00 | 00 | 00 | 02 | 01 | 00 |
| n+4 | 05 | 00 | B1 | 00 | 00 | 00 | 00 | 02 | 01 | 00 |
| n+5 | 05 | 00 | B1 | 00 | 00 | 00 | 00 | 02 | 01 | 00 |
| n+6 | 01 | 00 | A1 | absolute | time | | 00 | 05 | 00 | 00 |
| .. | .. | .. | .. | .. | .. | .. | .. | .. | .. | .. |
| n+9 | 05 | 00 | B2 | 02 | 00 | 00 | 00 | 00 | 00 | 00 |
| .. | .. | .. | .. | .. | .. | .. | .. | .. | .. | .. |
| n+12 | 01 | 00 | A2 | absolute | time | | 00 | 42 | 16 | 32 |
| .. | .. | .. | .. | .. | .. | .. | .. | .. | .. | .. |
| C { n+15 | 05 | 00 | 01 | 05 | 45 | 67 | 00 | 05 | 42 | 67 |
| .. | .. | .. | .. | .. | .. | .. | .. | .. | .. | .. |
| n+18 | 01 | 00 | 01 | absolute | time | | 00 | 00 | 02 | 01 |
| .. | .. | .. | .. | .. | .. | .. | .. | .. | .. | .. |
| n+21 | 05 | 00 | 02 | 42 | 16 | 32 | 00 | 40 | 00 | 00 |
| .. | .. | .. | .. | .. | .. | .. | .. | .. | .. | .. |
| n+24 | 01 | 00 | 02 | absolute | time | | 00 | 05 | 45 | 67 |
| .. | .. | .. | .. | .. | .. | .. | .. | .. | .. | .. |
| n+27 | 05 | 00 | C0 | C2 | 00 | 8C | 00 | 97 | 35 | 00 |
| .. | .. | .. | .. | .. | .. | .. | .. | .. | .. | .. |
| n+30 | 01 | 00 | 03 | absolute | time | | 00 | 12 | 04 | 09 |
| .. | .. | .. | .. | .. | .. | .. | .. | .. | .. | .. |
| B { n+33 | 05 | 00 | C1 | 04 | 8C | 60 | 00 | 00 | 00 | 00 |
| .. | .. | .. | .. | .. | .. | .. | .. | .. | .. | .. |
| n+36 | 01 | 00 | 04 | absolute | time | | 00 | 30 | 19 | 52 |
| .. | .. | .. | .. | .. | .. | .. | .. | .. | .. | .. |
| n+39 | 05 | 00 | B0 | FF | FF | FF | 07 | 63 | 00 | 00 |
| .. | .. | .. | .. | .. | .. | .. | .. | .. | .. | .. |
| n+42 | 01 | 00 | 05 | absolute | time | | 00 | 37 | 50 | 18 |
| .. | .. | .. | .. | .. | .. | .. | .. | .. | .. | .. |
| n+45 | 05 | 00 | B1 | 00 | 00 | 00 | 00 | 02 | 01 | 00 |
| .. | .. | .. | .. | .. | .. | .. | .. | .. | .. | .. |
| n+48 | 01 | 00 | A0 | absolute | time | | 00 | 01 | 00 | 00 |
| .. | .. | .. | .. | .. | .. | .. | .. | .. | .. | .. |
| n+51 | 05 | 00 | B2 | 02 | 00 | 00 | 00 | 00 | 00 | 00 |
| .. | .. | .. | .. | .. | .. | .. | .. | .. | .. | .. |
| n+54 | 01 | 00 | A1 | absolute | time | | 00 | 05 | 00 | 00 |
| .. | .. | .. | .. | .. | .. | .. | .. | .. | .. | .. |
| n+57 | etc. | | | | | | | | | |

METHOD AND APPARATUS FOR CONTROLLING RECORDING TO OPTICAL DISC TO COPE WITH SHOCK ERRORS

CROSS-REFERENCE TO RELATED APPLICATIONS

This application claims the benefit of Korean Patent Application No. 2003-10726, filed on Feb. 20, 2003, in the Korean Intellectual Property Office, the disclosure of which is incorporated herein by reference.

BACKGROUND OF THE INVENTION

1. Field of the Invention

The present invention relates to a method of controlling a recording operation of an optical disc drive, and more particularly, to a method of and apparatus for controlling a recording operation of an optical disc drive coping with an error resulting from an external shock during a recording operation on the once-writable optical disc such as a recordable compact disc (CD-R), a recordable digital versatile disc (DVD-R), or the like.

2. Description of the Related Art

Optical discs, such as CD-Rs and DVD-Rs, are well-known recording media on and/or from which data is recorded and/or reproduced. A pre-groove is spirally formed as a guide groove on a CD-R. Information as to the position of an optical disc drive over the CD-R and specifications of CD-R makers is recorded in the form of an Absolute Time In Pregroove (ATIP) in the pre-groove.

There are two methods for writing data to the CD-R or the DVD-R: Track-At-Once (TAO) and Disk-At-Once (DAO). In the TAO mode, writing is performed in each track. Here, one track corresponds to a unit of data recorded in an optical disc, for example, a piece of music. In the DAO mode, writing is performed on the entire optical disc until all the tracks are recorded.

In the TAO mode, data corresponding to one track is recorded, and then recording start and end positions are recorded in a program management area (PMA) of the optical disc. These processes are performed with respect to the remaining tracks of the optical disc. After finishing recording with respect to all tracks of the optical disc, a session is closed. Thereafter, a table of contents (TOC) information recorded in the PMA is recorded in a lead-in area of the corresponding session. In the DAO mode, data corresponding to one disc is recorded throughout on the optical disc. In other words, in the DAO mode, like a 'DISCCOPY' command in the MS DOS environment, data is recorded sequentially in a lead-in area, a data area, and the like.

Two types of errors occur during recording with respect to an optical disc: a buffer under run error and a shock error. The buffer under run error appears when a host stops offering data. The shock error arises due to an external shock during the operation of an optical disc recording apparatus.

Since the optical disc recording apparatus stores information about a recording position, the buffer under run error cannot be restored. Such a buffer under run error is disclosed in Korean Patent Publication Nos. 2000-11848, 2002-96989, and 2002-59695, published on Feb. 25, 2000, Dec. 31, 2002, and Jul. 13, 2002, respectively.

However, in a case of the shock error, a time instant when the shock error occurs is different from a time instant when the shock error is detected. In particular, since a position of a head deviating from a track due to an external shock is different from a position in which recording has stopped, it is difficult to exactly detect the position where recording has stopped. Thus, recording cannot normally restart from the position where recording has stopped.

Accordingly, in a conventional recording controlling method, when a shock error occurs, recording is stopped and an optical disc on which recording has been performed is discarded. However, since the optical disc still includes a recordable area, the discard of the optical disc is a loss for a user. In particular, when the shock error occurs during an initial recording operation or in a case of a DVD-R with large recording capacity, the user incurs a huge economic loss.

SUMMARY OF THE INVENTION

The present invention provides a method of controlling recording with respect to a once-writable optical disc minimizing loss of recording capacity and resume recording even when a shock error occurs due to an external disturbance.

The present invention also provides a recording controlling apparatus suitable for the method.

According to an aspect of the present invention, there is provided a method of controlling recording of data with respect to each track of a once-writable optical disc, including: detecting whether a shock error occurs during recording of track information; if the shock error is detected, stopping the recording of the track information and estimating a position where the recording of the track information has stopped; recording dummy data from a backward position behind the estimated position as much as a predetermined period of time, for a predetermined period of time; and defining an error track from a start position of a track to a position where the recording of the dummy data has ended.

According to another aspect of the present invention, there is provided an apparatus controlling recording of data with respect to each track of a once-writable optical disc, including: an encoder encoding recorded data; a laser driver generating a drive signal corresponding to the encoded data; an optical pickup generating a laser signal in response to the drive signal, irradiating the laser signal onto the once-writable optical disc, receiving the laser signal reflected from the once-writable optical disc, and generating a radio frequency signal; a radio frequency amplifier generating a track jump signal from the radio frequency signal, binarizing the radio frequency signal, and generating a reproduction signal; an Absolute Time In Pregroove decoder decoding Absolute Time In Pregroove information recorded on the once-writable optical disc, from the reproduction signal; a shock detector detecting whether a shock error occurs, based on the track jump signal; and a controller that, if the shock error is detected, stops a recording operation, estimates a position of the once-writable optical disc where the recording operation has stopped, with reference to the Absolute Time In Pregroove information, controls the optical pickup to record dummy data from a position after a predetermined period of time has elapsed from the estimated position, for a predetermined period of time and defines an error track from a start position of a track to a position where the recording of the dummy data has finished.

According to another aspect of the invention, a computer readable medium encoded with processing instructions for performing a method of controlling recording of data with respect to each track of a once-writable optical disc is provided. The method includes detecting whether a shock error occurs during recording of track information; if the shock error is detected, stopping the recording of the track information and estimating a position where the recording of the track information has stopped; recording dummy data from a backward position behind the estimated position as much as a predetermined period of time, for a predetermined period of time; and defining an error track from a start position of a track to a position where the recording of the dummy data has ended.

Additional aspects and/or advantages of the invention will be set forth in part in the description which follows and, in part, will be obvious from the description, or may be learned by practice of the invention.

BRIEF DESCRIPTION OF THE

These and/or other aspects and advantages of the invention will become apparent and more readily appreciated from the following description of the embodiments, taken in conjunction with the accompanying drawings of which:

FIG. 3 is a view showing TOC information recorded in a PMA, according to an embodiment of the present invention;

FIG. 4 is a view showing TOC information recorded in a lead-in area, according to an embodiment of the present invention.

DETAILED DESCRIPTION OF THE PREFERRED EMBODIMENTS

Figure 1:
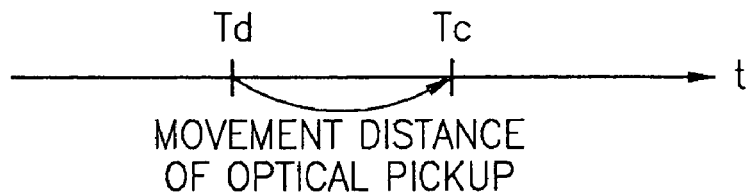
FIG. 1 is a view illustrating an effect of a shock error.

Reference will now be made in detail to the embodiments of the present invention, examples of which are illustrated in the accompanying drawings, wherein like reference numerals refer to the like elements throughout. The embodiments are described below to explain the present invention by referring to the figures.

A conventional recording apparatus used to record a CD-R includes an encoder, a recording laser driver, a reproduction laser driver, and a decoder. The encoder adds data position information to data input from an external source and encodes the input data using Eight to Fourteen Modulation (EFM). The recording laser driver irradiates the encoded data onto an optical disc. The reproduction laser driver reproduces data from the optical disc to detect an absolute time within the optical disc. The decoder decodes a laser beam reflected from the optical disc to decipher ATIP information.

Such a recording apparatus reads ATIP information from and/or record data on an optical disc using a reproduction laser driver and a decoder.

When the recording apparatus is subjected to an external shock during recording of data with respect to the optical disc, an optical pickup instantaneously crosses a minimum of several tracks or a maximum of several tens of tracks. Here, the tracks refer to concentric circles formed on the optical disc. This external shock produces an unrecorded area on the optical disc, resulting in an abnormal servo operation.

FIG. 1 is a view illustrating an effect of a shock error. Referring to FIG. 1, the effect of the shock error can be checked by detecting a track cross signal. In other words, when an optical pickup is subjected to a shock, the optical pickup crosses a minimum of several tracks or a maximum of several tens of tracks. As a result, several to several tens of track cross signals are instantaneously generated. Accordingly, a determination can be made from the detection of such a cross phenomenon as to whether the optical pickup receives a shock.

However, since a time instant when the shock is detected is different from a time instant when the optical pickup deviates from a normal recording position, it is difficult to find an exact position where normal recording has stopped. In other words, as shown in FIG. 1, since a time instant Td when the shock is detected is different from a time instant Tc when the optical pickup deviates from a normal recording position, an accurate position in which recording has stopped cannot be established.

Although recording normally restarts from the position where recording has stopped, it is difficult to precisely detect the position where recording has stopped. Accordingly, an overwritten area or an unrecorded area may appear. In view of the characteristics of the CD-R, normal reproduction from the overwritten area is impossible and a normal servo operation cannot be performed in the unrecorded area. As a result, normal reproduction from the CD-R is impossible. Due to this, in the conventional art, when a shock error occurs, an optical disc is discarded.

In order to solve the above described and/or other problems, in the present invention, dummy data is recorded in the vicinity of a portion where a shock error appears, so that although recording is incomplete, a servo control signal enough to control a servo is obtained so as to normally carry out a servo operation of an optical disc player. Also, the track including the dummy data is treated as an error track so that the optical disc player does not access the error track during reproduction. As a result, data can be normally recorded in the remaining portion of the optical disc.

Figure 2:
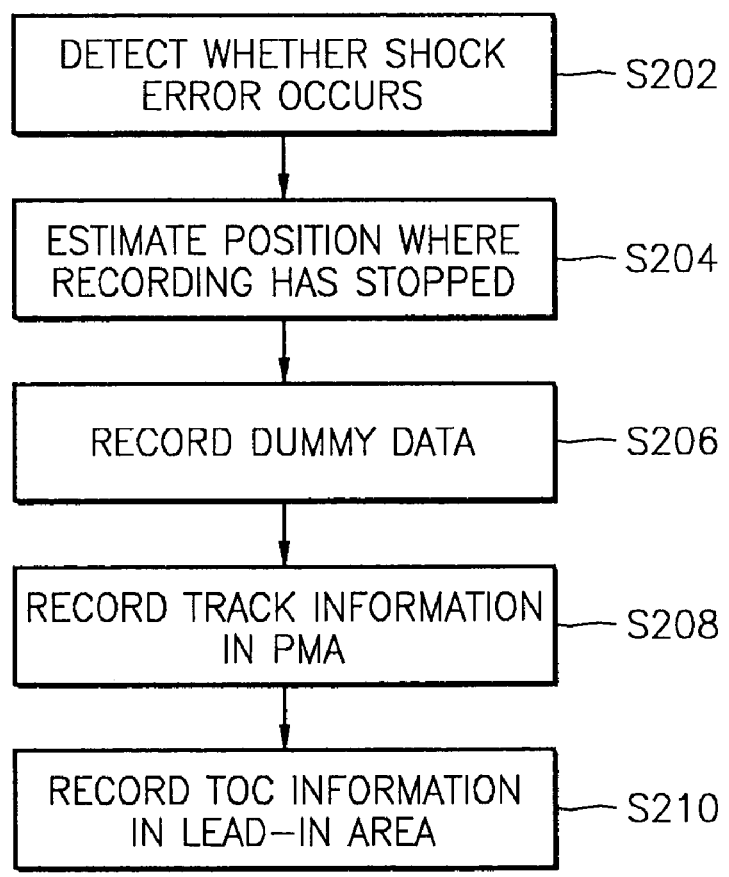
FIG. 2 is a flowchart explaining a method of controlling recording with respect to an optical disc, according to the present invention.

FIG. 2 is a flowchart explaining a method of controlling recording with respect to an optical disc, according to the present invention. Referring to FIG. 2, in operation S202, a determination is made as to whether a shock error occurs during recording. Whether the shock error occurs can be checked by detecting a track cross signal. In other words, when an optical pickup receives a shock, the optical pickup crosses a minimum of several tracks or a maximum of several tens of tracks, resulting in instantaneously generating several to several tens of track cross signals. As a result, the shock error can be checked by detecting these track cross signals.

In operation S204, a position where recording has stopped is estimated.

As previously described with reference to FIG. 1, a time instant when the shock error occurred is different from a time instant when the shock error was detected. Thus, the position where recording has stopped may not be precisely detected, but may be roughly estimated. In other words, the optical disc player sequentially reads data from a buffer and records the read data in an assigned recording position of an optical disc. Thus, the optical disc player can roughly find the position where recording has stopped, with reference to the assigned recording position.

In operation S206, the optical pickup moves a predetermined period of time back from the estimated position to generate new position information and record dummy data from the new position for a predetermined period of time. Here, the predetermined period of time is relative to an absolute time corresponding to the estimated position. The predetermined period of time is subtracted from the absolute time to obtain a new absolute time and allow the optical pickup to be located in a position corresponding to the new absolute time.

Dummy data is overwritten from the position corresponding to the absolute time for a predetermined period of time. The predetermined period of time for overwriting the dummy data includes a period during which data is not recorded due to an error, and preferably, is as short as possible. In the present embodiment, the predetermined period of time is 30 seconds. It is preferable that the dummy data is audio data with a value of 0.

When the dummy data is recorded, an absolute time, a relative time, and track information are recorded in a sub Q track like before an error occurs, so that an optical disc reproducing apparatus searches for those types of information.

Here, the absolute time is equal to an absolute time included in ATIP information recorded in a pre-groove, the relative time refers to a lapse time from a start position of a corresponding track (which is a recording unit), and the track information indicates track numbers and the like.

After the recording of the dummy data is completed, in operation S208, one track is set from a start portion of the position where recording has stopped to a position where the recording of the dummy data has ended in order to record the track information in a PMA. Here, the set track is treated as an error track so that the optical disc player does not access the set track. In order to show the error track, a value of a "POINT" field of the ATIP information to indicate a track number is newly set to a value which does not belong to a range defined for track numbers.

FIG. 3 is a view showing TOC information recorded in a PMA, according to an embodiment of the present invention. Referring to FIG. 3, the PMA is set near the innermost track of a CD-R to record temporally necessary information during recording with respect to the CD-R.

The TOC information is recorded in the PMA via a sub Q track and the meaning of each field of the sub Q track is as follows.

CONTROL&ADR;
01—indicates track information. In this case, the same value is repeatedly recorded for 5 frames.
02—indicates disc identification information. In this case, the same value is repeatedly recorded for 10 frames.
TN0 (Track No.);
00—indicates a lead-in area or a lead-out area.
01—indicates a data area.
POINT;
00—indicates the lead-in area.
01-99—indicate track numbers.
MIN/SEC/FRM;
indicates disc identification number when 'CONTROL&ADR' is "2".
indicates a start time (absolute time) of a corresponding track when 'CONTROL&ADR' is "1".
ZERO;
indicates information on the position of a frame including 'CONTROL&ADR'.
PMIN/PSEC/PRFM;
have values of "00 00 00" when 'CONTROL&ADR' is "02".
indicate an end time (absolute time) of the corresponding track when CONTROL&ADR is "01".

Part A of the TOC information indicates error tracks. The error tracks are characterized by that a "POINT" field indicating track numbers uses a value of "FF" which does not belong to standard values of "00-99". However, the "POINT" field is not necessarily limited to the value of "FF".

When a corresponding session ends in response to a disc close command, in operation S210, the TOC information is recorded in the lead-in area. The TOC information indicates start and end tracks of the CD-R. Here, in order to show the error track, a value of a "POINT" field of the ATIP information to indicate a track number is newly set to a value which does not belong to a range defined for track numbers.

FIG. 4 is a view showing the TOC information recorded in the lead-in area. Referring to FIG. 4, the TOC information is also recorded in the lead-in area via a sub Q track. Each piece of the TOC information is repeatedly recorded for 3 frames, and the meaning of each field of the sub Q track is as follows.

CONTROL&ADR; indicates mode information.
01—indicates that MIN/SEC/FRM corresponds to a start position.
05—indicates information to be skipped when 'POINT' is "01".
TNO (Track No.);
00—indicates the lead-in area or the lead-out area.
01—indicates a data area.
POINT;
A0—indicates a start position of a session.
A1—indicates an end position of the session.
A2—indicates a start position of the lead-out area.
01-99—indicate track numbers.
MIN/SEC/FRM;
indicate a disc identification number when 'CONTROL&ADR' is "02".
indicate a start time of a corresponding track when 'CONTROL&ADR' is "01".
ZERO;
indicates information on the position of a frame including 'CONTROL&ADR'.
PMIN/PSEC/PRFM;
indicate an end time of the corresponding track when 'CONTROL&ADR' is "01".

Part B of the TOC information indicates error tracks. The error tracks are characterized by that a "POINT" field indicating track numbers uses a value of "FF" which does not belong to standard values of "00-C1". However, the "POINT" field is not necessarily limited to the value of "FF".

As can be seen with part C of FIG. 4, a first track (01 track) has a shorter recording time than other tracks. This is because file system data and not general data is recorded in the first track.

Accordingly, when a recording error occurs in the first track, this indicates that a file system is damaged. Thus, a corresponding optical disc should be treated as a blank disc. The blank disc may be identified by assigning a non-standard value to a "POINT" field.

The TOC information is recorded in the lead-out area.

Figure 5:
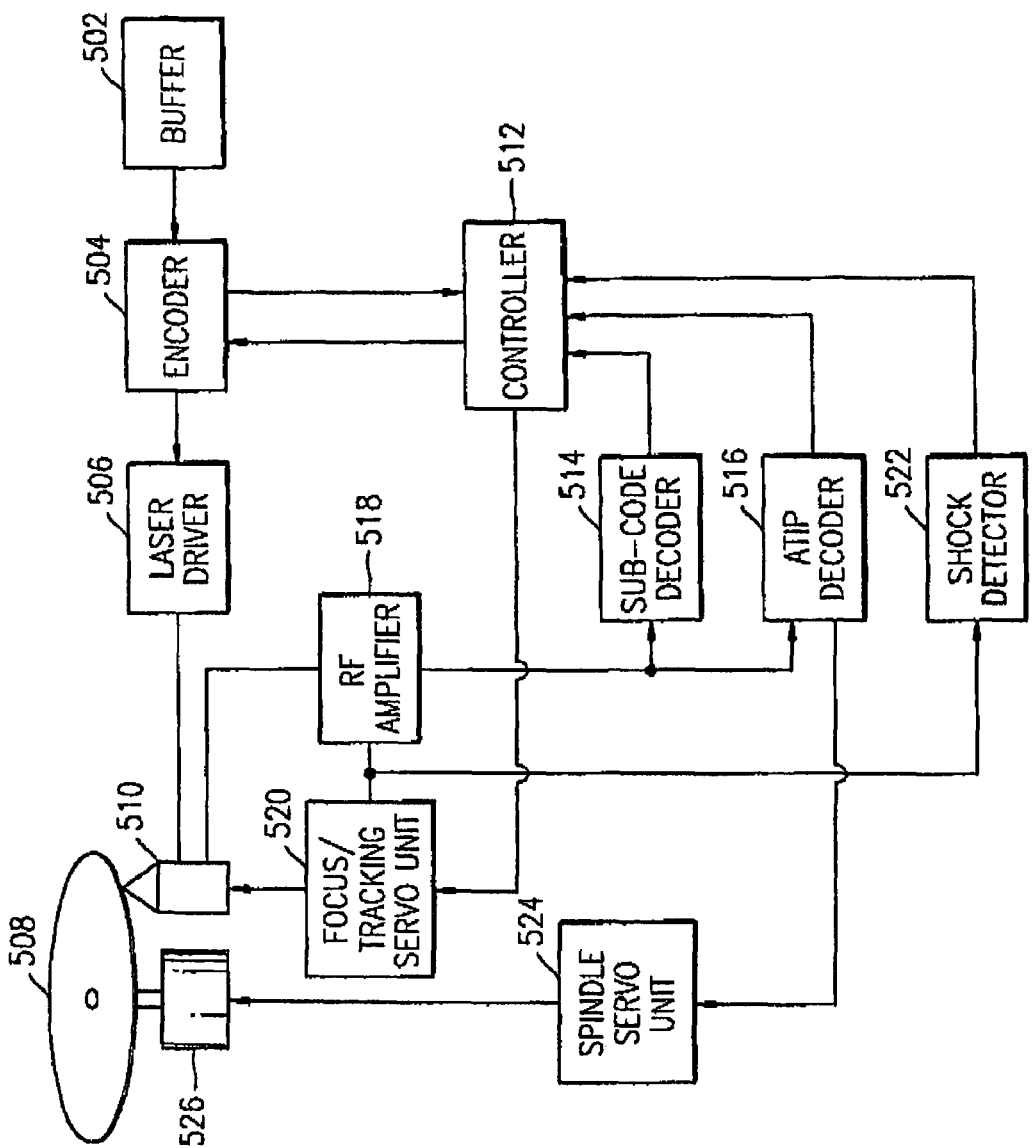
FIG. 5 is a block diagram of a recording controlling apparatus, according to an embodiment of the present invention.

FIG. 5 is a block diagram of a recording controlling apparatus, according to an embodiment of the present invention. Referring to FIG. 5, the recording controlling apparatus includes a buffer 502, an encoder 504, a laser driver 506, and an optical pickup 510. The buffer 502 buffers data input from an external source. The encoder 504 encodes data output from the buffer 502. The laser driver 506 generates a drive signal to record the encoded data. The optical pickup 510 generates a laser signal in response to the drive signal and irradiates the laser signal onto an optical disc 508.

The encoder 504 encodes data sequentially output from the buffer 502 using EFM and error correction coding (ECC) and then adds sync patterns, sub-code data, and the like to the encoded data. The encoder 504 also generates a sector sync signal, a frame sync signal, and the like.

In the CD-R, for example, 57624 bits, which are divided into 98 frames, are recorded in each sector. The 57624-bit data has already experienced EFM and ECC and includes sync patterns and sub-code data. Q channel data of the sub-code data indicates time information in a track of a corresponding sector.

A controller 512 controls the optical pickup 510 to determine a recording position on the optical disc 508. For this purpose, the controller 512 refers to Q channel data and ATIP information which is output from a sub-code decoder 514 and an ATIP decoder 516, respectively.

The optical pickup 510 irradiates the laser signal onto the optical disc 508 and generates a radio frequency (RF) signal corresponding to the magnitude of the laser signal reflected from the optical disc 508. An RF amplifier 518 amplifies the RF signal and then outputs the amplified RF signal to a focus and/or tracking servo unit 520 and a shock detector 522. The amplifier 518 also slices the amplified RF signal to generate binary reproduction signals and then outputs the binary reproduction signals to the sub-code decoder 514 and the ATIP decoder 516.

A spindle servo unit 524 controls the rotation of a spindle motor 526 with reference to the ATIP information decoded by the ATIP decoder 516.

A recording controlling operation of the recording controlling apparatus of FIG. 5 when a shock error occurs will now be explained in detail.

The shock detector 522 detects whether a shock error occurs, by detecting a track cross signal. In other words, when the optical pickup 510 receives a shock, the optical pickup 510 crosses a minimum of several tracks or a maximum of several tens of tracks to instantaneously generate several to several tens of track cross signals. Accordingly, the shock detector 522 can detect whether the shock error occurs, by detecting this cross phenomenon.

When the shock detector 522 detects the shock error, the shock detector 522 generates a shock error signal and outputs the shock error signal to the controller 512. When the controller 512 receives the shock error signal, the controller 512 stops a recording operation and estimates a position where the recording operation has stopped.

The controller 512 may estimate the position where the recording operation has stopped, with reference to the ATIP information which has been received before the shock error signal is generated. Alternatively, the controller 512 may estimate the position where the recording operation has stopped, with reference to a start position of a track (which is a recording unit) and a number of sectors and a number of frames which have been recorded until the shock error signal is generated.

The controller 512 moves the optical pickup 510 a predetermined period of time back from the position where the recording operation has stopped to obtain new position information. Here, the predetermined period of time is relative to an absolute time corresponding to the position where the recording operation has stopped. The predetermined period of time is subtracted from the absolute time to obtain a new absolute time.

The controller 512 controls the optical pickup 510 so as to be located in a position corresponding to the absolute time and then records dummy data in the corresponding position for a predetermined period of time, for example, 30 seconds. The controller 512 controls the encoder 504 to output the dummy data.

After finishing recording of the dummy data, the controller 512 controls the optical pickup 510 to record TOC information indicating that a corresponding track is an error track, in a PMA and a lead-in area of the optical disc 508.

The recording operation normally restarts from the position where recording of the dummy data has ended.

As described above, in a method and apparatus for controlling recording with respect to an optical disc, according to the present invention, when a shock error occurs, a position where a recording operation has stopped can be estimated, and then dummy data can be recorded in the vicinity of the estimated position. In addition, after the dummy data is completely recorded, the recording operation is normally performed in the remaining portion of an optical disc. Furthermore, a corresponding track can be treated as an error track so as not to access the error track during reproduction. As a result, a normal servo operation can be performed during reproduction, and the optical disc can be efficiently used without wasting recording capacity.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling recording of data with respect to each track of a once-writable optical disc, comprising:
   detecting whether a shock error occurs during recording of track information;
   if the shock error is detected, stopping the recording of the track information and estimating a position where the recording of the track information has stopped;
   recording dummy data from a backward position behind the estimated position, for a predetermined period of time; and
   defining an error track from a start position of a track to a position where the recording of the dummy data has ended.

2. The method of claim 1, wherein in the definition of the error track, when table of contents (TOC) information is recorded in one of a pregroove management area and a lead-in area of the once-writable optical disc, a value of a field indicating a track number is set to a non-standard value that indicates that the disc is blank.

3. The method of claim 1, wherein if the shock error occurs during recording of a first track information in a data area of the once-writable optical disc, the once-writable optical disc is treated as a blank disc.

4. The method of claim 1, wherein the dummy data corresponds to audio data with a value of 0.

5. The method of claim 4, wherein when the dummy data is recorded, sub channel data is constituted so that an absolute time, a relative time, and track information are consistent with those of previously recorded data.

6. The method of claim 1, wherein the shock error is detected by detecting whether several or several tens of tracks cross signals are instantaneously generated.

7. An apparatus controlling recording of data with respect to each track of a once-writable optical disc, comprising:
   an encoder that encodes the data;
   a laser driver that generates a drive signal corresponding to the encoded data;

an optical pickup that generates a laser signal in response to the drive signal, irradiates the laser signal onto the once-writable optical disc, receives the laser signal reflected from the once-writable optical disc, and generates a radio frequency signal;

a radio frequency amplifier that generates a track jump signal from the radio frequency signal, binarizes the radio frequency signal, and generates a reproduction signal;

an Absolute Time In Pregroove decoder that decodes Absolute Time In Pregroove information recorded on the once-writable optical disc, from the reproduction signal;

a shock detector that detects whether a shock error occurs, based on the track jump signal; and a controller that, if the shock error is detected, stops a recording operation, estimates a position of the once-writable optical disc where the recording operation has stopped, with reference to the Absolute Time In Pregroove information, controls the optical pickup to record dummy data from a position after a predetermined period of time has elapsed from the estimated position, for a period of time and defines an error track from a start position of a track to a position where the recording of the dummy data has finished.

8. The apparatus of claim 7, wherein the controller allocates a non-standard value to a field indicating a track number of the error track, when table of contents (TOC) information is recorded in one of a pregroove management area and a lead-in area of the once-writable optical disc, the non-standard value indicating that the optical disc is blank.

9. The apparatus of claim 7, wherein the dummy data corresponds to audio data with a value of 0.

10. The apparatus of claim 7, wherein when the dummy data is recorded, sub channel data is constituted so that an absolute time, a relative time, and track information are consistent with those of previously recorded data.

11. The apparatus of claim 7, wherein the shock detector detects the shock error by detecting whether several or several tens of tracks cross signals are instantaneously generated.

12. A method controlling recording of an optical disk, comprising:
determining whether a shock error has occurred during recording by detecting a track cross signal;
estimating a position where the recording has stopped;
recording dummy data at a predetermined period of time back from the estimated position where the recording has stopped;
recording track information in a Program Management Area (PMA) from a start portion of the position where the recording has stopped to a position where the recording of the dummy data ended.

13. The method of claim 12, wherein if the shock error occurs during recording of a first track information in a data area of the once-writable optical disc, the once-writable optical disc is treated as a blank disc.

14. The method of claim 12, wherein the dummy data corresponds to audio data with a value of 0.

15. The method of claim 14, wherein when the dummy data is recorded, sub channel data is constituted so that an absolute time, a relative time, and track information are consistent with those of previously recorded data.

16. The method of claim 12, wherein the shock error is detected by detecting whether several or several tens of tracks cross signals are instantaneously generated.

17. The method of claim 12, wherein the predetermined period of time includes a period during which data is not recorded due to an error.

18. An apparatus controlling recording of data onto an optical disc, comprising
an optical pickup receiving a signal reflected from the optical disc, and generating a radio frequency signal;
a radio frequency amplifier generating a track jump signal form the radio frequency signal;
a shock detector detecting whether a shock error occurs, based on the track jump signal; and
a controller that, if the shock error is detected, stops a recording operation, estimates a position of the optical disc where the recording operation has stopped, controls the optical pickup to record dummy data from the estimated position where the recording has stopped, records dummy data for a predetermined period of time onto the optical disc, and sets a track from a start position where the recording has stopped to a position where the recording of the dummy data has ended.

19. The apparatus of claim 18, wherein the controller allocates a non-standard value to a field indicating a track number of the error track, when table of contents (TOC) information is recorded in one of a pregroove management area and a lead-in area of the once-writable optical disc, the non-standard value indicating that the optical disc is blank.

20. The apparatus of claim 18, wherein the dummy data corresponds to audio data with a value of 0.

21. The apparatus of claim 18, wherein when the dummy data is recorded, sub channel data is constituted so that an absolute time, a relative time, and track information are consistent with those of previously recorded data.

22. The apparatus of claim 18, wherein the shock detector detects the shock error by detecting whether several or several tens of tracks cross signals are instantaneously generated.

23. The apparatus of claim 18, wherein when the dummy data is recorded, an absolute time, a relative time, and track information are recorded in a sub Q track before the error occurs, so that the apparatus searches for the absolute time, the relative tie and the track information.

24. The apparatus of claim 18, wherein the controller estimates the position where the recording operation has stopped, with reference to Absolute Time In Pregroove (ATIP) information received before a shock error signal is generated.

25. The apparatus of claim 18, wherein the controller estimates the position where the recording operation has stopped, with reference to a start position of the track and a number of sectors and a number of frames which have been recorded until a shock error signal is generated.

26. A computer readable medium encoded with processing instructions for performing a method of controlling recording of data with respect to each track of a once-writable optical disc, the method comprising:
detecting whether a shock error occurs during recording of track information;
if the shock error is detected, stopping the recording of the track information and estimating a position where the recording of the track information has stopped;
recording dummy data for a period of time, from a backward position behind the estimated position; and defining an error track from a start position of a track to a position where the recording of the dummy data has ended.

27. The computer readable medium of claim 26, wherein in the method, the definition of the error track, when table of contents (TOC) information is recorded in one of a pregroove management area and a lead-in area of the oncewritable optical disc, a value of a field indicating a track number is set to a non-standard value indicating that the optical disc is blank.

28. The computer readable medium of claim 26, wherein in the method, if the shock error occurs during recording of a first track information in a data area of the once-writable optical disc, the once-writable optical disc is treated as a blank disc.

29. The computer readable medium of claim 26, wherein in the method, the dummy data corresponds to audio data with a value of 0.

30. The computer readable medium of claim 29, wherein in the method, when the dummy data is recorded, sub channel data is constituted so that an absolute time, a relative time, and track information are consistent with those of previously recorded data.

31. The computer readable medium of claim 26, wherein in the method, the shock error is detected by detecting whether several or several tens of tracks cross signals are instantaneously generated.

32. A method of controlling recording of data with respect to each track of a once-writable optical disc, comprising:
  recording dummy data in a vicinity of a portion where a shock error appears, so that although recording is incomplete, a servo control signal enough to control a servo is obtained so as to normally carry out a servo operation of an the optical disc.

* * * * *